United States Patent [19]

Brady et al.

[11] Patent Number: 4,874,804

[45] Date of Patent: Oct. 17, 1989

[54] HOT MELT ADHESIVES BASED ON ETHYLENE-N-BUTYL ACRYLATE

[75] Inventors: Francis X. Brady, Whitehouse Station; Thomas F. Kauffman, Phillipsburg, both of N.J.

[73] Assignee: National Starch and Chemical Corporation, Bridgewater, N.J.

[21] Appl. No.: 235,577

[22] Filed: Aug. 24, 1988

Related U.S. Application Data

[62] Division of Ser. No. 64,261, Jun. 19, 1987, Pat. No. 4,816,306.

[51] Int. Cl.$^4$ .................. C08L 23/08; C08L 33/08; C08L 91/06

[52] U.S. Cl. ................. 524/100; 524/275; 524/289; 524/291; 524/333; 524/343; 524/351; 524/487; 524/489

[58] Field of Search ............... 524/487, 489, 275, 100, 524/291

[56] References Cited

U.S. PATENT DOCUMENTS

| | | | |
|---|---|---|---|
| 3,884,786 | 5/1975 | Domine et al. | 524/487 |
| 4,146,521 | 3/1979 | Godfrey | 524/487 |
| 4,167,433 | 9/1979 | Lakshmanan | 524/487 |
| 4,404,299 | 9/1983 | Decroix | 524/487 |
| 4,434,261 | 2/1984 | Brugel et al. | 524/435 |
| 4,471,086 | 9/1984 | Foster | 524/487 |
| 4,500,661 | 2/1985 | Lakshmanan | 524/487 |
| 4,567,223 | 1/1986 | Ames | 524/489 |
| 4,631,308 | 12/1986 | Graham et al. | 524/487 |
| 4,752,634 | 6/1988 | Goss | 324/487 |

OTHER PUBLICATIONS

"Ethylene-n-butyl Acrylate Resins for Adhesive Formulating", Preliminary Information Report, U.S.I. Chemicals.

*Primary Examiner*—Allan M. Lieberman
*Attorney, Agent, or Firm*—Ellen T. Dec; Edwin M. Szala

[57] ABSTRACT

Hot melt packaging adhesive compositions consisting essentially of 35 to 45% by weight of an ethylene n-butyl acrylate copolymer containing 25-45% by weight, preferably 30 to 40% n-butyl acrylate and having a melt index of at least 50; 35 to 55% of a terpene phenolic tackifier; and 10 to 20% by weight of a high melting synthetic wax provide adhesives characterized by an excellent balance of high and low temperature performance without sacrifice to machinability or thermal stability.

9 Claims, No Drawings

HOT MELT ADHESIVES BASED ON ETHYLENE-N-BUTYL ACRYLATE

This application is a division of application Ser. No. 064,261, filed June 19, 1987, now U.S. Pat. No. 4,816,306.

BACKGROUND OF THE INVENTION

Hot melt adhesives are widely used in industry for various applications such as product assembly and packaging, including particularly, for use in cardboard case sealing and carton closing operations. Some of these operations (e.g. for cartons, cases or trays used for packaging molten cheese at 60° C. and its subsequent storage at freezer temperatures of $-18°$ to $-6°$ C. or for packaging yogurt or freshly baked goods at temperatures greater than about 40° C.) require a hot melt adhesive with exceptionally high heat resistance (ability to maintain a fiber tearing bond at elevated temperatures) without sacrificing good cold resistance (ability to maintain a high strength bond in the cold with no tendency to fracture). Moreover, the viscosity of such adhesives must be low enough and the set speed fast enough to give good machinability, for example, on rapid-fire, automatic equipment with short compression sections which are used in commercial case or carton operations. The thermal stability and aesthetics also must be such as to produce no charring, skin, or gel formation coupled with a small viscosity change followed prolonged aging at typical operating temperatures (e.g. 175° C.) so as to minimize down time for maintenance and to provide consistent application patterns and amounts during operation. These aesthetic considerations have become more important in recent years as customers increasingly demand hot melt adhesives having pot clarity, i.e. adhesives which are clear in their molten form.

Hot melt case and carton sealing products available and in commercial use today (primarily polyethylene and ethylene vinyl acetate formulations) lack one or more of the previously described propoperties; (1) high temperature end use performance; (2) low temperature end use performance; (3) clean machining; (4) low viscosity; (5) desireable aesthetics (clarity); (6) satisfactory thermal stability; (7) and/or low cloud point (below 120° C.). It would therefore be an advance in the art to provide another hot melt adhesive having good bond strengths (i.e., producing fiber tear) at both high and low temperatures coupled with low viscosity, fast set speed and excellent thermal stability, machining and aesthetics.

SUMMARY OF THE INVENTION

We have found that hot melt packaging adhesive compositions consisting essentially of 35 to 45% by weight of an ethylene n-butyl acrylate copolymer containing 25–45% by weight, preferably 30 to 40% n-butyl acrylate and having a melt index of at least 50; 35 to 55% of a terpene phenolic tackifier; and 10 to 20% by weight of a high melting point synthetic wax provides an adhesive characterized by an excellent balance of high and low temperature performance without sacrifice to its machinability or thermal stability.

In particular, the compositions claimed herein are characterized by viscosity of less than 4000 cps at 175° C., fiber tearing bonds from Kraft paper at within the complete rate of 0° to 160° F. (approximately $-18°$ C. to 70° C.), a Ring and Ball softening point of 105°–115° C., a cloud point less than 120° C. and which are clear at 175° C. Moreover, the adhesives possess excellent thermal stability as characterized by less than a 10% viscosity change after 72 hours at 175° C. with no signs of char, skinning or gel formation. As such, these adhesives find particular application in the area of high speed packaging, and particularly for packaging which will be exposed to extremes in temperature as encountered in packing, transport and storage.

DETAILED DESCRIPTION OF THE PREFERRED EMBODIMENTS

The ethylene/n-butyl acrylate copolymers (EnBA) most useful herein are those containing from about 30 to 40% by weight n-butyl acrylate. The preferred copolymers are available from U.S.I. Chemical under the designation EA80808, EA89821 or EA89822 and contain approximately 35% n-butyl acrylate by weight. Additionally, the ethylene n-butyl acrylate copolymer has a melt index (MI) of at least about 50, preferably 100 to 400. Mixtures of various EnBA copolymers falling within these ranges may also be used. The amount of the copolymer present in the adhesive varies from 35 to 45% by weight.

The tackifying resins useful in the adhesive compositions are the terpene phenolic resins, i.e., phenolic modified terpene resins and hydrogenated derivatives thereof such, for example, as the resin product resulting from the condensation, in an acidic medium, of a bicyclic terpene and a phenol. For use herein, it is also important that the tackifying resin have Ring and Ball softening point of at least about 110° C., preferably about 125° C. Representative commercial resins include Piccofin T 125 from Hercules, Nirez V-2040 from Reichold and PRL-300 from Reichold with Nirez V-2040 HM from Reichold, a phenolic modified terpene having a Ring and Ball softening point about 125° C., being the most preferred. These resins are utilized in amounts of 35–55% by weight of the adhesive composition.

The wax used herein is a high melting (above about 100° C.) synthetic wax such as synthetic, high density, low molecular weight polyethylene waxes or "Fischer-Tropsch" wax. Suitable waxes include Paraflint H-1-Sasol-SA wax, Escomer H-101 (Exxon Chemical) and preferably Bareco C-4040, a low molecular weight polyethylene wax from Petrolite. The wax component is utilized at levels of 10 to 20% by weight of the adhesive.

The adhesives of the invention preferably also contain a stabilizer or antioxidant. Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency, and correspondingly, its reactivity; this steric hindrance thus providing the phenolic compound with its stabilizing properties. Representative hindered phenols include; 1,3,5-trimethyl 2,4,6-tris (3,5-di-tert-butyl-4-hydroxybenzyl)benzene; pentaerythrityl tetrakis-3(3,5-di-tert-butyl-4-hydroxyphenyl)- propionate; n-octadecyl-3(3,5-di-tert-butyl-4-hydroxyphenyl)propionate; 4,4'-methylenebis (2,6-tert-butylphenol); 4,4'-thiobis (6-tert-butyl-o-cresol); 2,6-di-tert-butylphenol; 6-(4-hydroxyphenoxy)-2,4-bis(n-octyl-thio)-1,3,5triazine; di-n-octylthio)ethyl 3,5-di-tert-butyl-4-hydroxy-benzoate; and sorbitol hexa[3-(3,5-di-tert-butyl-4-hydroxyphenyl)-propionate].

The performance of these antioxidants may be further enhanced by utilizing, in conjunction therewith known synergists such, for example, as thiodipropionate esters and phosphites, particularly useful is distearylthiodipropionate. These stabilizers, if used, are generally present in amounts of about 0.1 to 1.5 weight precent, preferably 0.25 to 1.0%. Other additives such as plasticizers, pigments, dyestuffs conventionally added to hot melt adhesives for various end uses contemplated may also be incorporated in minor amounts into the formulations of the present invention.

The adhesive compositions are prepared by blending the components in the melt at a temperature of about 130°-200° C. until a homogeneous blend is obtained, approximately 2 hours. Various methods of blending are known to the art and any method that produces a homogeneous blend is satisfactory.

The resulting adhesives are characterized by viscosity of less than 4000 cps at 175° C., fiber tearing bonds from Kraft paper within the complete temperature range of −18° C. to +70° C., a Ring and Ball softening point of 105°-115° C., a cloud point less than 120° C. and clarity at 175° C. Moreover, the adhesives possess excellent heat stability as characterized by less than a 10% viscosity change after 72 hours at 175° C. with no signs of char, skinning or gel formation. As such the adhesives find particular use as packaging adhesives, for example, for sealing cases and cartons which are to be exposed to extreme temperature conditions. In contrast, similar adhesive compositions which use ethylene vinyl acetate as the copolymer produce a cloudy, poor flowing, thermally less stable product not suitable for high speed, rapid-fire hot melt application systems now in commercial use.

EXAMPLES

In the following examples which are provided for illustrative purposes only, all parts are by weight and all temperatures in degrees Celsius unless otherwise noted.

In the examples, all adhesive formulations were prepared in single blade mixer heated to 170° C. by blending the components until homogeneous.

The adhesives were then subjected to various tests simulating the properties needed for successful commercial applications.

Test Procedures

Melt viscosities of the hot melt adhesives were determined on a Brookfield Model RVT Thermosel viscometer using a number 27 spindle.

Test specimens for determining elevated temperature peel and shear strengths were prepared as follows: an adhesive bead ½ inch wide was applied at 175° C. to a strip of 50 pound Kraft paper 1 inch wide by 3 inches long across the width of the paper. A second piece of Kraft paper of the same dimensions was immediately placed over the first piece and 200 gram weight placed on top of the composite construction. The compressed adhesive bead width was 1 inch.

Elevated temperature peel and elevated temperature shear were determined by attaching a 100 gram weight to each specimen and placing the specimens in a forced-draft oven. The temperature was raised in 5.5° C. (10° F.) increments from 38° C. The specimens remained at a given temperature for 15 minutes for conditioning. The heating cycle was run until the final bond failed. Each peel and shear specimen was prepared and tested in duplicate. The elevated peel and shear value shown is the average temperature of failure for the two bonds.

Adhesion at 71° C., room temperature (22° C.), 4.4° C., −6.7° C., −17.8° C. and −28.9° C., where applicable, was determined by applying a ½ inch wide bead of adhesive at 175° C. widthwise to a 2 inch by 3 inch piece of corrugated board and immediately bringing a second piece of board with flutes in the opposite direction into contact. A 200 gram weight was immediately placed on the construction. The boardstock was 275 pound burst strength corrugated board. The bonded specimans were placed in an oven at 71° C. and freezers at 4.4° C., −6.7° C., −17.8° C., and −28.9° C. The bonds were separated by hand and a determination made as to the type of failure. Fiber tearing (FT) and non-fiber tearing bonds (NFT) were noted.

The adhesive set time was determined in the following manner using 50 pound Kraft paper and an adhesive tester that simulates a case sealing line: Kraft samples 2 inches by 6 inches were placed in the grips of the tester. The bottom specimen was moved forward at a constant speed under the melt nozzle applicator for the application of the adhesive bead and was stopped directly under the top specimen. The vertical cylinder pressure was preset at 20 psi and, after a predetermined open time, moved the top specimen downward to contact the lower specimen. Contact was maintained for a given compression time and force after which the top substrate was separated from the lower substrate by reversal of the air flow operating the vertical cylinder. The adhesive bead width was adjusted by nitrogen pressure to give a width of ½ inch following compression. Several tests were carried out under the following conditions: Open time 1 sec, Vertical Cylinder Pressure 20 psi. The shortest time required to obtain 80% of the adhesive bonds having immediate fiber tearing bonds was reported as set time.

The thermal stability of the adhesive blends was determined in the following manner: 100 grams of adhesive was placed in a clean 8 oz. glass jar and covered with aluminum foil. The jars were then placed in forced-draft ovens at 175° C. or other relevant temperatures and aged for 24, 48, 72, and/or 100 hours. After these time intervals the specimen was analyzed for color change and presence of char and non-thermoplastic material (skin or gel) and the viscosity measured. Unusual behavior such as separation and lack of clarity were also noted.

Cloud point is determined by heating the adhesive blends to 175° C. and applying a small bead (approx. 1 gram) of the molten adhesive to the bulb of an ASTM thermometer. The temperature at which the molten adhesive clouds over is then noted. These measures of cloud point provide an indication of a hot melt's overall compatability, i.e. the compatibility of the individual ingredients with each other. Products that show cloud points near or at the softening point of the wax used in the formulation reflect an overall compatable product. The cloudiness that develops as the material cools is the result of the developing crystallinity of the waxy component (causing refraction of light passing through the sample). Systems which possess cloud points much greater than the softening point of the wax exhibiting a micro separation changing the refraction index of the molten adhesive. The practical significance of products with high cloud points are as follows:
(1) Poor inherent compatability with a tendency to phase separation upon prolonged heating and heating and cooling cycling such as is experienced in commercial operations.
(2) Poor flow properties resulting in "stringing" from rapid fire, air actuated nozzle equipment.

Stringing Test: Using the same adhesive tester as described in the adhesive set time test, a hot melt adhesive's tendency to string and flow poorly, or cut off poorly can be observed. Using constant orifice size and constant gun and tank pressures the hot melt adhesive was fired onto a sheet of black paper. The temperature of the tank, which in this case was nearly the same as the nozzle temperature, was lowered 5.5° C. (10° F.) at a time. The test was continued until the adhesive begins to string, flow poorly or fail to cut off properly.

EXAMPLE I

This example illustrates the improved aesthetic benefits of two adhesives of the present invention (A and C) when compared with ethylene vinyl acetate based adhesives (Elvax from DuPont) formulated to provide similar viscosity levels (B and D).

| Adhesive Components | A | B | C | D |
|---|---|---|---|---|
| Bareco C4040 Wax | 15 | 15 | 15 | 15 |
| 400 MI EnBA (35% nBA) | 38 | — | — | — |
| Elvax 210 (28% VA, 400 MI) | — | 38 | — | 13 |
| Elvax 240 (28% VA, 45 MI) | — | — | — | 25 |
| 100 MI EnBA (35% nBA) | — | — | 38 | — |
| Nirez V2040 HM | 47 | 47 | 47 | 47 |
| Irganox 1010 | 0.2 | 0.2 | 0.2 | 0.2 |
| Irgafos 168 | 0.2 | 0.2 | 0.2 | 0.2 |

| | Adhesive | | | |
|---|---|---|---|---|
| Tests Results | A | B | C | D |
| Viscosity at 175° C. | 1525 cps | 1650 cps | 3675 cps | 4687 cps |
| Cloud Point | 110° C. | >175° C.* | 116° C. | >175° C.* |
| Peel | 70° C. | 65/70° C. | 65/70° C. | 76° C. |
| Shear | 93° C. | 93° C. | 93° C. | 93° C. |
| Adhesion | | | | |
| +4° C. | FT | FT | FT | FT |
| −7° C. | FT | FT | FT | FT |
| −18° C. | FT | FT | FT | FT |
| −29° C. | FT | FT | FT | FT |
| 71° C. | FT | FT | FT | FT |
| Set Speed | 1 sec | 1 sec. | 1 sec. | 1 sec. |
| Softening Point (Ring & Ball) | 105° C. | 104° C. | 105° C. | 107° C. |
| Heat Stability 72 hrs at 175° C. | Clear | Cloudy | Clear | Cloudy |
| Color | lt. brown | lt. brown | lt. brown | lt. brown |
| Edge Ring | Light | Light | Light | None |
| Volatile Char. | None | Very light | Very light | None |
| Skin/gels | No skin/ No gel | No skin/ No gels | No skin/ No gels | No skin/ No gels |
| Final Vis. 175° C. | 1575 cps | 1700 cps | 3750 cps | 4875 cps |
| % Vis Change | +3.3% | +3.0% | +2.04% | +4% |

*Cloud point greater than 175° C. cannot be determined.

The results of this example show the improved properties, as illustrated by cloud point and heat stability, obtained using the specific adhesive formulations of the invention.

EXAMPLE II

Following the procedure and testing methods described above, two additional adhesive formulations were prepared. Adhesive E, formulated with a blend of ethylene n-butyl acrylate copolymers, exhibited an excellent balance of properties and, in particular, showed superior aesthetic and heat stability properties when compared with a similarly formulated blend of ethylene vinyl acetate copolymers (Adhesive F).

| Components | E | F |
|---|---|---|
| Synthetic Wax C-4040 Bareco | 15 | 15 |
| ENBA 35% nBA, 100 MI | 15 | — |
| ENBA 35% nBA, 400 MI | 20 | — |
| EVA, 28% VA, 45 MI | — | 10 |
| EVA, 28% VA, 400 MI | — | 25 |
| Nirez V2040 HM, Reichold | 50 | 50 |
| Irganox 1010 | 0.2 | 0.2 |
| Irgafos 168 | 0.2 | 0.2 |

| Tests | E | F |
|---|---|---|
| Viscosity @ 175° C. | 1525 cps | 2025 cps |
| Cloud Point | 110° C. | >175° C. |
| Peel | 70/76° C. | 70/76° C. |
| Shear | 88/93° C. | 88/93° C. |
| Adhesion | | |
| −18° C. | FT | FT |
| −29° C. | FT | FT |
| +71° C. | FT | FT |
| Heat Stability 72 hours, 175° C., 60 grams, covered | | |
| Color | dark yellow | dark yellow |
| General Characterization | no skin, gels, or separation | separation no skin or gels |
| % Vis. Change | −3.2 | Not determined because of separation |

As noted above, the adhesive composition of the invention provided superior properties to a similar adhesive based on ethylene vinyl acetate which actually separated under the conditions of the heat stability test.

EXAMPLE III

The following example was performed varying the relative amounts of wax and resin in accordance with the teachings of the present invention. In addition to the four adhesive formulations (G–J) of the invention, test results are also shown for a commercially employed ethylene vinyl acetate adhesive (K).

| Components | G | H | I | J |
|---|---|---|---|---|
| Bareco C 4040 Wax | 15 | 12 | 14 | 13 |
| 400 MI EnBA | 38 | 38 | 38 | 38 |
| Nirez V 2040 HM | 47 | 50 | 48 | 49 |
| Irganox 1010 | 0.2 | 0.2 | 0.2 | 0.2 |
| Irgafos 168 | 0.2 | 0.2 | 0.2 | 0.2 |

| Test Results | G | H | I | J | K |
|---|---|---|---|---|---|
| Viscosity 175° C. | 1575 cps | 1775 cps | 1625 cps | 1700 cps | 1100 cps |
| Cloud Pt | 110° C. | 113° C. | 115° C. | 116° C. | 116° C. |
| Peel | 71° C | 71° C. | 71° C. | 71° C. | 65° C. |
| Shear | 87/94° C. | 87/94° C. | 87/94° C. | 87/94° C. | 87/94° C. |
| Adhesion | | | | | |
| 4° C. | FT | FT | FT | FT | NFT |
| −7° C. | FT | FT | NFT | FT | NFT |
| −18° C. | FT | NFT | FT | FT | NFT |
| 71° C. | FT | FT | FT | FT | NFT |

The above results show that the commercial product (K) does not provide the balance of heat and cold resistance obtained with adhesives G–J.

EXAMPLE IV

This example shows the improved compatability and machining characteristics of the claimed adhesives (L) over similar adhesives (M) based on ethylene vinyl acetate.

| | L | M |
|---|---|---|
| EnBA 400 MI, 35% nBA | 45 | — |
| EVA, 400 MI, 28% VA | — | 45 |
| Paraflint H-1 | 20 | 20 |
| Nirez V-2040 HM | 35 | 35 |
| Irganox 1010 | 0.2 | 0.2 |
| Irgafos 168 | 0.2 | 0.2 |
| Stringing Test | | |
| Onset of Stringing | 154° C. | 166° C. |
| Set Speed | 1–2 sec. | 1–2 sec. |
| Viscosity @ 175° C. | 1450 cps | 1787 cps |
| Cloud Pt. | 108° C. | 143° C. |
| Peel | 63° C. | 63° C. |
| Shear | 93° C. | 88° C. |
| Heat Stability | | |
| Color | Light Amber | Light Amber |
| Skin/Gels | None | None |
| Final Visc. | 1500 cps | 1812 |
| % Visc. Change | +3.4% | +1.4% |

The results show the undesirability high cloud point (143° C.) for the ethylene vinyl acetate based adhesive.

EXAMPLE V

An additional series of adhesives was prepared and tested utilizing a variety of waxes and/or tackifier combinations within the scope of the present invention.

| Components | N | O | P | Q | R | S | T | U | V |
|---|---|---|---|---|---|---|---|---|---|
| Bareco C4040 Wax | 15 | — | — | 15 | — | — | 15 | — | — |
| Sasol Wax | — | 15 | — | — | 15 | — | — | 15 | — |
| Escomer H101 | — | — | 15 | — | — | 15 | — | — | 15 |
| Nirez V2040 HM | 47 | 47 | 47 | — | — | — | — | — | — |
| Piccofin T 125 | — | — | — | 47 | 47 | 47 | — | — | — |
| Nirez V2040 | — | — | — | — | — | — | 47 | 47 | 47 |
| 400 MI EnBA | 38 | 38 | 38 | 38 | 38 | 38 | 38 | 38 | 38 |
| Antioxidant | 0.2 | 0.2 | 0.2 | 0.2 | 0.2 | 0.2 | 0.2 | 0.2 | 0.2 |
| Test Results | | | | | | | | | |
| Viscosity 175° C. | 1450 cps | 1450 cps | 1650 cps | 1575 cps | 1550 cps | 1750 cps | 1475 cps | 1475 cps | 1750 cps |
| Cloud Point | 114° C. | 114° C. | 114° C. | 114° C. | 120° C. | 120° C. | 114° C. | 114° C. | 121° C. |
| Peel | 60/66° C. | 60° C. | 60° C. | 66° C. | 66° C. | 66° C. | 66° C. | 60° C. | 60° C. |
| Shear | 93° C. | 88° C. | 88° C. | 93° C. | 88° C. | 88° C. | 93° C. | 88° C. | 88° C. |
| Adhesion | | | | | | | | | |
| 71° C. | FT | FT | FT | NFT | FT | FT | FT | FT | NFT |
| 4° C. | FT | FT | FT | FT | FT | FT | FT | FT | FT |
| −7° C. | FT | FT | FT | FT | FT | FT | FT | FT | FT |
| −18° C. | FT | FT | FT | FT | FT | FT | FT | FT | FT |
| Heat Stability 72 hrs at 175° C. | | | | | | | | | |
| Color | Light Amber | Light Amber | Light Amber | Light Amber | Light Amber | Light Amber | Light Amber | Light Amber | Light Amber |
| Volatile Char | None | None | None | V. Light | Light | V. Light | None | None | None |
| Skin/Gels | None | None | None | None | None | None | None | None | None |
| Smoke/Odor | Moderate | Moderate | Moderate | Moderate | Moderate | Moderate | Moderate | Moderate | Moderate |
| Final Vis 175° C. | 1525 cps | 1500 cps | 1750 cps | 1600 cps | 1575 cps | 1800 cps | 1600 cps | 1550 cps | 1825 cps |
| % Vis Change | +5.1% | +3.4% | +6.06% | +1.6% | +1.6% | +2.85% | +8.4% | +5.0% | +4.2% |

We claim:
1. Hot melt adhesive compositions consisting essentially of:
   (a) 35 to 45% by weight of at least one ethylene n-butyl acrylate copolymer containing 25–45% by weight n-butyl acrylate and having a melt index of at least 50;
   (b) 35 to 55% of a terpene phenolic tackifier having a Ring and Ball softening point of at least about 110° C.; and
   (c) 10 to 20% by weight of a polyethylene or Fischer-Tropsch synthetic wax having a melting point above about 100° C.;
said adhesive characterized by a viscosity of less than 4000 cps at 175° C., fiber tearing bonds from Kraft paper within the complete range of −18° C. to 70° C., a Ring and Ball softening point of 105°–115° C., a cloud point less than 120° C., clarity at 175° C. and less than a 10% viscosity change after 72 hours at 175° C. with no char, skinning or gel formation.

2. The adhesive of claim 1 wherein the ethylene/n-butyl acrylate copolymer contains about 30% n-butyl acrylate.

3. The adhesive of claim 1 wherein the ethylene/n-butyl acrylate copolymer has a melt index between 100 and 400.

4. The adhesive of claim 1 wherein the tackifying resin has a Ring and Ball softening point of at least about 125° C.

5. The adhesive of claim 1 wherein the tackifying resin is a phenolic modified terpene resin having a Ring and Ball softening point of at least 125° C.

6. The adhesive of claim 1 wherein the wax is a synthetic, high density, low molecular weight polyethylene wax.

7. The adhesive of claim 1 containing a blend of an ethylene/n-butyl acrylate copolymer having a melt index of 45 and an ethylene/n-butyl acrylate copolymer having a melt index of 400.

8. The adhesive of claim 1 consisting essentially of a blend of an ethylene/n-butyl acrylate copolymer having a melt index of 45 and an ethylene/n-butyl acrylate copolymer having a melt index of 400; a phenolic modified terpene resin having a Ring and Ball softening point of at least 125° C. and a synthetic, high density, low molecular weight polyethylene wax.

9. The hot melt adhesive of claim 1 wherein there is additionally present 0.1 to 1.5% stabilizer selected from the group consisting of 1,3,5-trimethyl 2,4,6-tris(3,5-di-tert-butyl-4-hydroxybenzyl)benzene; pentaerythrityl tetrakis-3-(3,5-di-tert-butyl-4-hydroxyphenyl)propionate; n-octadecyl-3(3,5-di-tert-butyl-4-hydroxyphenyl)-propionate; 4,4'-methylenebis (2,6-tert-butylphenol); 4,4'-thiobis (6-tert-butyl-o-cresol); 2,6-di-tertbutyl-phenol; 6-(4-hydroxyphenoxy)-2,4-bis(n-octyl-thio)-1,3,5triazine; di-n-octylthio)ethyl 3,5-di-tert-butyl-4-hydroxy-benzoate; and sorbitol hexa[3-(3,5-di-tert-butyl-4-hydroxyphenyl)-propionate].

* * * * *